Figure 1:
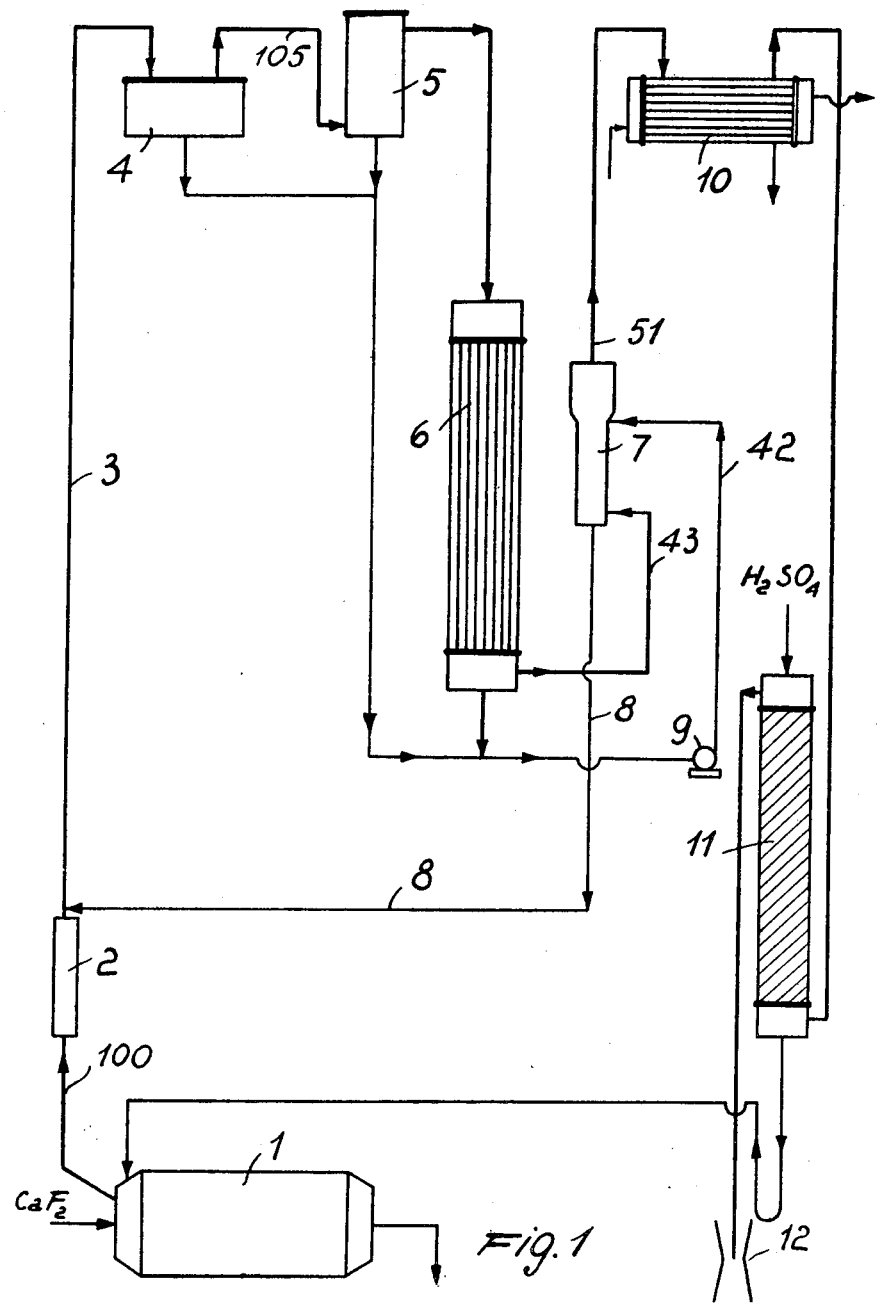

DOMENICO ZANON
CLAUDIO SPERANDIO
INVENTOR.

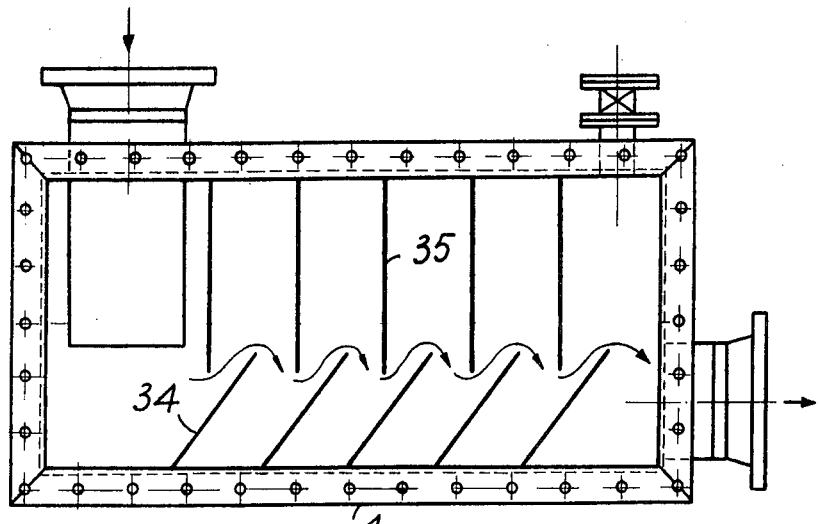

3,199,952
PROCESS FOR THE PRODUCTION OF HIGH STRENGTH, HIGH PURITY HYDROFLUORIC ACID
Domenico Zanon and Claudio Sperandio, both of Milan, Italy, assignors, by mesne assignments, to Edison, Milan, Italy, a corporation of Italy
Filed July 11, 1961, Ser. No. 123,208
Claims priority, application Italy, July 21, 1960, 632,844
6 Claims. (Cl. 23—153)

This invention relates to an improved process for the production of high-strength, high-purity hydrofluoric acid.

It is known that hydrofluoric acid is generally produced today on an industrial scale by using fluorite as the raw material containing fluorine; the fluorite is treated, by processes which may be continuous or discontinuous, with sulphuric acid under heat in special reactor ovens; solid calcium sulphate and hydrofluoric acid—the latter usually as a gas—are formed from the reaction between the sulphuric acid and the fluorite.

It is also known, however, that the producers of hydrofluoric acid require fluorite with a special grade of purity, known as "acid grade," with a content not less than 97–98% of $CaF_2$, not more than 1–1.5% of carbonates, not more than 1–1.5% of silica and a sulphur content (both free and combined in metallic sulphides) of the order of 0.03%. It is in fact the case that, during the treatment of the fluorite with sulphuric acid, all these impurities are the cause of increased sulphuric acid and $CaF_2$ consumption, give rise, furthermore, to undesirable compounds which can be the direct cause of irregular functioning of the plant, and contaminate the obtained hydrofluoric acid. The carbonates, in fact, react with the sulphuric acid giving rise to the formation of the related sulphate, with a corresponding loss of sulphuric acid, and the formation of carbon dioxide and water; the silica normally reacts with the hydrofluoric acid already produced to form water and silicon tetrafluoride; the sulfides react with the sulphuric acid giving rise to the formation of hydrogen sulphide.

The silica is considered the most dangerous impurity because it causes considerable losses of hydrofluoric acid, which is converted to silicon tetrafluoride with water being formed at the same time, thus increasing the corrosiveness of the hydrofluoric acid on the various parts of the plant. Finally, it is known that, in the absence of water, silicon tetrafluoride is not retained by the hydrofluoric acid when the latter is liquefied, whereas if water is present, the silicon tetrafluoride remains in the hydrofluoric acid in the form of fluosilicic acid, and constitutes an impurity thereof.

Therefore, in order to produce liquid hydrofluoric acid with at least 97–98% HF titre—normally called "technical hydrofluoric acid"—with the lowest possible content of fluosilicic acid and other impurities in general, it is necessary, apart from using ingredients free from moisture, to operate generally in such a manner as to eliminate as far as possible the formation of water (which will be formed none the less) and of other high-boiling products; this must normally be done before the hydrofluoric acid gas is condensed.

Several methods have been proposed for removing from the hydrofluoric acid gas the impurities contained therein, such as water, sulphuric acid, fluosulphonic acid, these being all products with boiling points higher than that of hydrofluoric acid. For example in U.S. Patents 2,088,048 and 2,047,210 and French Patent 652,258, processes are described whereby the impure hydrofluoric acid gases are cooled to a temperature lower than the boiling point of the high-boiling impurities, but higher than the boiling point of hydrofluoric acid; a liquid phase is separated out containing water, sulphuric acid and hydrofluoric acid, which products are thus removed from the hydrofluoric acid which remains in the gaseous state. This liquid phase is called "acid drip." This method does not allow the water accompanying the hydrofluoric acid gas to be completely separated out, and hence the hydrofluoric acid gas is still contaminated to a certain extent with water and sulphuric acid; furthermore, during the cooling process, besides water and sulphuric acid a considerable quantity of hydrofluoric acid is also condensed out which, since it is mixed with sulphuric acid and water, must be separately utilized and alters the development of the reaction when re-cycled.

Other methods adopted for re-hydrating the hydrofluoric acid gases coming from the reactor-generator consist in washing it with concentrated sulphuric acid or even with sulphuric acid containing free $SO_3$ (sulphur trioxide); the water in the hydrofluoric acid gases is absorbed by the sulphuric acid and reacts with the $SO_3$ to form sulphuric acid. In this case too, the de-hydration is not complete and in addition considerable quantities of fluosulphonic acid formed by the reaction between hydrofluoric acid and $SO_3$ or sulphuric acid, pass into the hydrofluoric-acid gas thus contaminating the final product. The same result is arrived at if, besides sulphuric acid, a certain quantity of sulphuric acid containing free $SO_3$, is placed in the reactor-generator; the hydrofluoric-acid gases that are formed still contain water together with greater or lesser quantities of fluosulphonic acid, and these impurities cannot be completely separated out by partial condensation.

According to another known process, the fluorite, instead of being treated with concentrated sulphuric acid, is treated with sulphuric acid containing a considerable quantity of free $SO_3$; in this case, the hydrofluoric acid formed is all present as fluosulphonic acid which, at a later stage and separately from the HF purifying line, is decomposed, by hydrolysis through adding water and heating simultaneoeusly for example, into hydrofluoric acid and dilute sulphuric acid; the latter must then be re-concentrated so that it can be re-used.

Moreover, in the special conditions in which the process is usually operated, the HF produced contains sulphur dioxide ($SO_2$)—an impurity which is particularly damaging in some chemical processes and may also, under certain conditions, give rise to the separation of sulphur. The $SO_2$, if considered as an inert substance, means that the volume of inert substances is increased and hence also the quantity of HF present in the tail gases, and moreover, because of its solubility in liquid HF, $SO_2$ is also found in part in the technical product.

The sulphur problem is also particularly important in connection with the regular and continuous running of the plant. Because, amongst other things, of the presence of sulphides in the starting fluorite and also because of an actual reduction of sulphuric acid, sulphur tends to separate out along the whole length of the plant and particularly at the points where the gases are cooled, so that, by accumulating, it easily gives rise to deposits which may alter the correct working conditions and which, sooner or later, cause clogging and make it necessary to have a special gas cooling, purifying and condensing line for cleaning purposes.

The sulphur is also likely to separate after the condensation of the anhydrous HF and, particularly when it separates in the colloidal form, it creates difficulties in the use of the HF, for example in the regulating apparatus for feeding it into plants making use of it.

In view of the nature of the contemplated acid and the reaction and the corrosion phenomena which are heightened every time the plant is stopped, it becomes particularly important to reduce stoppages for maintenance of the cooling, purifying and condensing line to a minimum.

In known processes, the sulphur is generally separated in coolers consisting of nests of tubes inside which the gases to be condensed pass and outside which the cooling medium, usually water, passes. In order to facilitate maintenance, these coolers generally consist of two (or more) cooling units in series, in the first of which most of the sulphur is separated and which thus needs more frequent cleaning, and in the second of which most of the cooling of the gases takes place. In this manner, the operations of cooling the gases and separating the sulphur take place practically simultaneously.

The difficulty of obtaining a technical HF with 98–99% HF and small water, sulphuric acid, $SO_2$ and sulphur contents, has led industry to use almost exclusively fluorite of a special grade known as "acid grade." The use of "acid grade" fluorite is due essentially to technical reasons, on account of the difficulties encountered in obtaining a pure HF and in getting high efficiency and yields.

An object of the present invention is to provide a process for the production of technical HF with high HF titre, even up to 99%, and low contents of sulphuric acid, fluosilicic acid, $SO_2$ and water, by improving the gas cooling, purifying and condensation line with the object—amongst other things—of reducing corrosion and simplifying the same and reducing maintenance expenses and the number of stoppages for cleaning.

Another object of the present invention is to provide an improved process for the production of high-titre technical HF, up to 98–99%, whereby fluorite of a lower grade of purity can be used, that is fluorite with even only 90% of $CaF_2$, up to 9% of silica, up to 5% of carbonates and up to 0.5% of sulphur, while still obtaining high yields; the use of these types of fluorite obviously has a considerable bearing on the production costs of hydrofluoric acid.

Another object of the invention is to create special anhydrous reaction conditions in the generating stage, such as to prevent practically completely the silica from being attacked by the HF produced, thus making for a simpler HF purifying and condensation line and a saving in HF.

A further object of the invention, is to obtain, by means of suitable separating and catalysis equipment, the blocking of the sulphur carried along by the HF gas, in a single part of the plant; and also to exploit the condensates produced by this equipment, after bringing them together with those coming from the cooling system, for the purpose of eliminating completely the fluosulphonic acid which is present with the hydrofluoric acid.

Yet other objects are considerably to reduce the cost of the plant by simplifying all the equipment thereof, and to make possible an enormous reduction in the amount of corrosion taking place thus enabling the plant to be constructed almost entirely of iron without having to use special materials.

All these objects and advantages can with advantage be provided by a process for producing high strength HF, comprising a reactor of known type in which the fluorite is attacked by $H_2SO_4$ of the desired concentration which is determined in accordance with the composition of the starting mineral (e.g. a 100% concentration with the $H_2SO_4$ pre-mixed oleum) so that the silica will not be attacked by the HF produced, but, on the contrary, will form a bond with the $SO_3$ in the form of fluosulphonic acid, which process, according to the invention, provides a set of improvements in the line of cooling, purifying and condensing the gas produced, the fundamental characteristics whereof consist in causing the gases coming from said reactor to pass through a device for separating the powders or suspended solid particles and condensing out the high-boiling impurities, in which the gases are flowed over a liquid surface formed by the high-boiling condensates in thermal equilibrium with the gases, and thence through a second device with the functions of acting as a catalyst and separating the sulphur, so as to have the sulphur separated out in a pre-determined locality which is of easy access, convenient to clean and of very large capacity, while still avoiding the occurance of marked corrosion phenomena or leakages; then in cooling the gases so purified, from suspended particles and sulphur, in counterflow with cooling water, bringing together the condensates of the previous devices with those of the cooler under different thermal equilibrium conditions, and finally in washing the gases in counterflow with the mixture of said condensates, so as to eliminate the fluosulphonic acid present in the reaction gases, if necessary varying the water content of said condensates in order to obtain complete hydrolysis of the fluosulphonic acid, and re-cycling the condensates already obtained, after washing same, into the reactor, without altering the anhydrous conditions of the latter.

By washing, according to the invention, the HF gases, for example before the condensation of the final technical product by means of the condensates deriving from various points of the plant and having therefore different equilibrium conditions, the following advantages are obtained in practice:

(1) Complete elimination of the fluosulphonic acid present in the gas carried along and produced in the reactor, on account of the $SO_3$ titre of the initial sulphuric acid fed in;

(2) A further reduction in the high-boiling constituents present in the gases, which, because of their low partial vapour pressure, had not been separated in the previous cooling;

(3) The elimination, by means of the hydrolysis of the fluosulphonic acid, of most of the water present in the condensates; the latter can thus go back into the generator, after washing, without upsetting the anhydrous equilibrium of the reaction;

(4) The possibility of varying the water content present in the condensates deriving from the several points of the plant, according to the variations in the content of fluosulphonic acid in the gases, it being possible, for this purpose, to introduce water or recovered solutions, of hydrofluoric acid coming from other utilizations, into the washing column.

(5) Elimination of large filters for absorbing the fogs which in other processes, the gas usually carries along with it, which filters consist, for example, of very large containers full of coke to absorb the water and above all the sulphuric acid combined as fluosulphonic acid which is difficult to separate, and the replacement of said filters by devices which take up less space, cost less and are easy to construct.

After this washing, the thus purified HF gas can be condensed, the uncondensable gases thence being washed directly in counterflow with the acid used to attack the fluorite, in order to recover the last traces of uncondensed HF, which is possible since we are dealing with an acid with a not very high content of free $SO_3$.

When the hydrofluoric acid has to have an HF titre higher than 99% and the quantities of sulphuric acid, fluosulphonic acid, fluosilicic acid, water and sulphur dioxide present have to be reduced practically to traces, it may be more convenient to treat the 98–99% technical HF separately.

The improved process according to the invention may be more clearly understood from the detailed description which follows, wherein reference is made to the accompanying drawing wherein FIG. 1 is a block diagram of the plant which is shown purely for illustrative purposes and is not limiting. The plant, shown in this diagram, is, according to the invention, particularly suitable for the treating besides acid grade fluorite, also fluorite of lower quality with a $CaF_2$ content of the order of 90%, carbonates and silica content up to about 10% and 0.3–0.5% of S (free and/or as sulphides).

FIGURES 2, 3 and 4 show some apparatus of the purifying equipment forming part of the inventive system.

Referring now to the figures, in generator 1 of the known type, the fluorite is mixed with sulphuric acid of pre-determined strength which may vary from 99% to 102%. The attacking sulphuric acid is prepared by pre-mixing in suitable proportions, sulphuric acid (98% strength for example) with 105% oleum, in separate tanks which are not shown.

The approximate composition in volume of the gases, coming out of generator through tube 100, may be deemed to be as follows:

|  | Percent |
|---|---|
| HF | 85–95 |
| $H_2SO_4$ | 5–2 |
| $H_2O$ | 5–2 |
| $SO_2$ | 2–1 |
| Inerts, the balance. | |

The temperature of the gases as they come out the generator is about 200–250° C.

The pressure is slightly lower (about 10–100 mm.) than atmospheric pressure. The powders or suspended particles are removed from the gases coming out of the generator by passing said gases through the hollow vertical separator 2 which is shown in FIG. 2. Here the gases are washed not only by the condensates formed by spontaneous cooling of the gases along the connecting tube 3, but also by the condensates from apparatus 7 arriving through pipe 8. In separator 2 there are provided deflectors 22 which slope towards the centre of the separator. The condensates drip down deflectors 22 and cascade from one deflector to another, thus meeting the gases in counterflow and washing same. Filter 2 is of very small size in comparison with those on known apparatuses.

The object of separator 2 is to bring about contact between the ascending vapor phase and the descending liquid phase.

The composition of the former is practically the same as that given for the gases, whilst the composition of the liquid phase varies between the values given herebelow:

|  | Percent |
|---|---|
| $H_2SO_4$ | 20–40 |
| $H_2O$ | 20–40 |
| Inerts, the balance. | |

The gaseous phase coming out of the apparatus in question has a composition which is not very different from that of the ingoing gases.

In this apparatus, in fact, no attempt is made to bring about a radical separation for the simple reason that this is carried out by the subsequent apparatuses; the apparatus thus carries out a mixed function in the sense that, besides fixing a certain amount of sulphuric acid and water in the liquid state, it effects a preliminary knocking down of the suspended particles and restores a modest amount of the heat loss to the gas phase, since the condensates which enter the separator come out therefrom at a temperature about 60–100° C. higher than the input temperature.

Through connecting tube 3 the gases are directed into the "powder box" 4 (shown in FIG. 3) which consists of a container which may be of rectangular cross-section and is fitted with deflectors 34 and 35 suitably arranged as shown in the drawing. This apparatus is so designed that the last traces of suspended powder are precipitated by the action of deflectors 34 and 35 and a further condensation of the high boiling impurities takes place due to the fact that the gases are made to skim the condensates on the bottom of apparatus 4, and hence tend to come rapidly into equilibrium therewith.

There is a temperature drop of about 50° C. in the powder boxes.

The working pressure is a few mm. lower than atmospheric pressure (about 100–200 $H_2O$).

Gases pass through the powder boxes at the rate of about 3–4 m. per second.

The structure of the powder boxes is such that the gas is obliged to skim the surface of the liquid a certain number of times sufficient to separate almost all the sulphuric acid and water from the gas. In practice, even though complete equilibrium conditions are not reached, there is an extremely intense process of separation of the sulphuric acid from the gas, and it may be assumed that the two phases—liquid and vapor phases—which are in contact with each other during the process, have the following average compositions by volume:

|  | Input gas, percent | Output gas, percent |
|---|---|---|
| HF | 90–95 | 93–98 |
| $H_2SO_4$ | 3–1 | 0.5 |
| $H_2O$ and inerts | balance | balance |

Average composition of the liquid by weight:

|  | Percent |
|---|---|
| $H_2SO_4$ | 40–20 |
| $H_2O$ | 40–20 |
| HF, the remainder. | |

The condensates are discharged from the appartus through an overflow outlet which is not shown.

From "powder box" 4 the gases enter the "sulphur purifier" 5 from the bottom, through pipe 105. In this appaartus the gases pass through a set of rather fine iron meshes, which, in known manner, catalyze the reaction whereby sulphur is formed from hydrogen sulphide with sulphur dioxide, the sulphur being separated in the soild state.

The following is the chemical equation which represents this separation reaction:

$$2H_2S + SO_2 \rightarrow 2H_2O + 3S$$

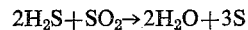

The working temperature is about 100° C.

The composition of the output gas phase from the sulphur purifier does not differ from that of the input gas phase to the apparatus, except as regards the $H_2S$ content which practically disappears, and the $SO_2$ content whereof, however a fair quantity still remains.

Any condensates separated in this apparatus are discharged from the bottom thereof and re-united with the condensates coming from apparatus 4. From apparatus 5 the gases are conveyed into a single cooling nest of tubes 6 wherein practically all the high-boiling impurities are condensed.

The cooling liquid which circulates around the nest of tubes is water.

The temperature of the input gas lies within the range 80–100° C.; that of the output gas within the range 35–45° C.

The average composition of the input and output gas is as follows:

| | Percent |
|---|---|
| HF | 98.0 |
| $H_2SO_4$ | 0.2 |
| $H_2O$ | 0.2 |
| $SO_2$ | 0.1 |
| Inerts, balance. | |

The temperature of the condensates obtained at the output from the cooler varies from 35 to 45° C. From cooler 6 the gases enter the "washing column" 7 from the bottom through the small tube 43; said washing column is filled in its bottom part with Raschig rings and is shown in FIG. 4. Washing column 7 is a small column filled with Raschig rings (44) made of carbon which are sustained by the grating 45, in which the liquid and the gas phases are brought into close contact in order to bring about the hydrolytic decomposition of the fluosulphonic acid contained in the vapor phase, by means of water contained in the re-cycled liquid phase; the re-cycled liquid is taken particularly from the bottom of cooling apparatus 6.

In practice the ratio of liquid to gas is about 1:10, the quantity of liquid being expressed in kg. and the quantity of gas in m.³.

In apparatus 7 the gases are washed by the condensates coming from apparatuses 4, 5 and 6, which are introduced through tube 42 into the top layer of Raschig rings by means of circulation pump 9. The concentration of these condensates is established and regulated, according to the invention, according to the running conditions of the plant, and in particular according to the properties of the fluorite used, the possibility being provided of correcting said concentration with water, oleum and dilute hydrofluoric acid, in order to bring it to the desired composition. By means of this washing, the fluosulphonic acid contained in the gases is completely decomposed and removed, and the gases undergo a further effective cooling and tend to be brought into equilibrium with the liquid phase used for washing. Since the composition of the liquid phase can be modified as desired, it is thus possible to influence the composition of the gases in order to obtain the maximum purity. The top portion of "washing column" 7 has an enlarged cross-section and contains a device for drop separation such as, for example, a set of metallic meshes 46 or a suitable arrangement of deflectors.

From apparatus 7 the hydrofluoric acid gases pass through tube 51 into the tube nest condenser 10, where they are liquefied.

In apparatus 10 the gas phase consisting mainly of hydrofluoric acid, accompanied by inerts which are separated in the apparatus, is condensed.

The vapor phase enters the condenser at a temperature within the range 35–45° C., and in the nest of tubes therefore, the gas is cooled down to the condensation temperature (about 20° C.). The gas is condensed in the middle part, whilst in the end part super-cooling of the liquid (down to 0–5° C.) takes place.

The composition by volume of the uncondensables is roughly as follows:

Air and inerts _____percent__ 95
HF, balance.

The uncondensable gases, before being eliminated, are washed in the small column 11 with the acid used for the attack of fluorite.

The apparatus indicated by the numeral 11 is a small washing column filled with Raschig carbon rings, in which the liquid phase, sulphuric acid originally fed into the plant, meets a counterflow of gaseous phase from the condenser (apparatus 10) and removes from the latter any small quantities of hydrofluoric acid which it may still entrain.

Thus the only difference in the composition of the gas at the input and at the output, is in the almost complete absence of HF in the gas leaving the column.

The input temperature of the gas is about 0° C., and the output temperature thereof is slightly higher and depends in particular on the entrained quantity of hydrofluoric acid since when this dissolves in the sulphuric acid, heat is developed.

Under normal operating conditions, the temperature at the output is near to ambient temperature.

The uncondensables, having been washed, are discharged from the top of column 11 under suction from ejector 12 which has the function of keeping the whole plant under suction.

Still according to the invention, in contrast to known systems, the sulphuric acid fed in is prepared in special tanks separately from the plant itself; in said tanks, the sulphuric acid is pre-mixed with oleum until the desired strength is reached according to the type of fluorite used; the reason for this is that the impurities contained in the fluorite can lead to the formation of water, and hence the free $SO_3$ concentration in the $H_2SO_4$ which is fed in, must be adjusted in accordance with the maximum fluosulphonic acid content which it is desired to have present in the generator, said content being in turn dependent on the content of $SiO_2$ in the fluorite itself.

It is intended that all matter contained in the foregoing description and shown in the accompanying figures shall be taken as illustrative and not in a limiting sense.

We claim:
1. A process for the production of high-strength high-purity hydrofluoric acid which comprises the steps of:
 (a) reacting fluorite with a mixture of concentrated sulphuric acid and sulphur trioxide under anhydrous conditions to produce a gaseous reaction product containing solid impurities, hydrogen fluoride and high-boiling impurity components including water and sulphuric acid;
 (b) conveying the resulting gaseous reaction product into a condensing zone containing a liquid of high-boiling components, consisting essentially of about 20 to 40 weight-percent of sulphuric acid, from about 20 to 40 weight-percent of water and from about 20 to 60 weight-percent of hydrogen fluoride;
 (c) passing the gaseous reaction product over the surface of said liquid to scrub said solid impurities from said gaseous product and to effect absorption of the sulphuric acid and water contained in said gaseous product by said liquid;
 (d) passing the gaseous product as scrubbed in step (c) over a catalyst to convert hydrogen sulfide and sulphur dioxide impurities contained in said gaseous product to water and solid sulphur and separating the solid sulphur thus formed and produce a gaseous effluent;
 (e) cooling the effluent of step (d) to a temperature below 45° C. to condense residual high-boiling impurities, the resulting gaseous product contains fluosulphonic acid;
 (f) collecting the condensate liquid resulting from steps (c), (d) and (e);
 (g) washing the gaseous product of step (e) with the mixture of liquids resulting from step (f) to eliminate fluosulphonic acid from the gaseous product, thereby producing a gas rich in hydrogen fluoride; and
 (h) liquefying the hydrogen fluoride in the gas of step (g) by cooling it below a temperature of 20° C. and collecting the liquid hydrofluoric acid.

2. A process according to claim 1, wherein the composition of said mixture of condensate liquids from steps (c), (d) and (e) is adjusted by addition thereto of substances selected from the group which consists of water, sulphur trioxide and dilute hydrofluoric acid to maintain the water content of the mixture in relation to the fluosulphonic acid content of the gas such that said fluosulphonic acid of the gas is decomposed to yield hydrogen fluoride in step (g).

3. A process according to claim 1, wherein the gas remaining after step (h) is washed by passing it countercurrent to the sulphuric acid to be reacted with fluorite in step (a).

4. A process according to claim 1, wherein said fluorite is acid grade.

5. A process according to claim 1, wherein said catalyst of step (d) is a set of iron meshes adapted to convert hydrogen sulfide and sulphur dioxide to water and sulphur and forming a tortuous path for said liquid.

6. A process according to claim 1, wherein the sulphuric acid of step (a) has a concentration of from 98 to 102%.

References Cited by the Examiner
UNITED STATES PATENTS

| | | | |
|---|---|---|---|
| 2,047,210 | 7/36 | Lawrence | 23—153 |
| 2,414,884 | 1/47 | Matuszak | 23—153 |
| 2,456,509 | 12/48 | Hopkins et al. | 23—153 |
| 2,459,438 | 1/49 | Kremers et al. | 23—153 |
| 2,753,245 | 7/56 | Mitchell et al. | 23—153 |
| 2,846,290 | 8/58 | Yacoe | 23—153 |
| 2,991,155 | 7/61 | Zarron et al. | 23—153 |
| 3,004,829 | 10/61 | Boyle et al. | 23—153 |

MAURICE A. BRINDISI, *Primary Examiner.*